C. S. GOBY.
VALVE FOR INTERNAL COMBUSTION ENGINES AND THE LIKE.
APPLICATION FILED OCT. 22, 1914. RENEWED MAR. 17, 1916.

1,234,459.  Patented July 24, 1917.

Witnesses,
E. B. Filchrist
L. I. Porter

Inventor,
Clifford S. Goby
by Thurston & Kwis
attys.

UNITED STATES PATENT OFFICE.

CLIFFORD S. GOBY, OF CLEVELAND, OHIO.

VALVE FOR INTERNAL-COMBUSTION ENGINES AND THE LIKE.

1,234,459.  Specification of Letters Patent.  Patented July 24, 1917.

Application filed October 22, 1914, Serial No. 367,945. Renewed March 17, 1916. Serial No. 84,953.

*To all whom it may concern:*

Be it known that I, CLIFFORD S. GOBY, a citizen of the United States, residing at Cleveland, in the county of Cuyahoga and State of Ohio, have invented a certain new and useful Improvement in Valves for Internal-Combustion Engines and the like, of which the following is a full, clear, and exact description.

This invention relates to valves with particular reference to rotary valves adapted particularly for use with internal combustion engines. The invention covers certain modifications of the valve claimed in my prior application Serial No. 799,949, filed Nov. 8, 1913.

The present invention resides particularly in the so-called packing for valves, especially rotary valves, such as are employed in the engine shown in my prior application aforesaid. The main objects of this invention are to provide a packing which effectively prevents leakage of gas longitudinally and corcumferentially of the valve; which adapts itself to inequalities in the wall of the valve chamber; which compensates for changes due to variations in temperature, and which in effect has a floating action with reference to the valve actuating parts connected to the valve body.

My invention may be briefly summarized as consisting in certain novel details of construction and combinations and arrangements of parts which will be described in the specification and set forth in the appended claims.

Figure 5:
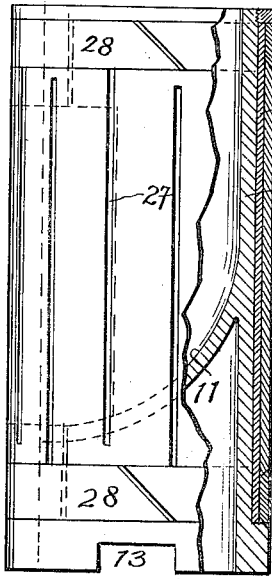
Figure 1:
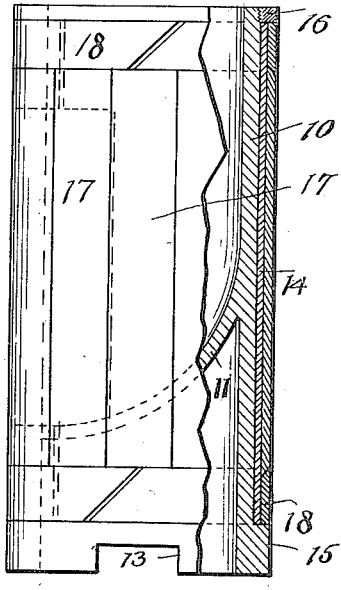
Figure 4:
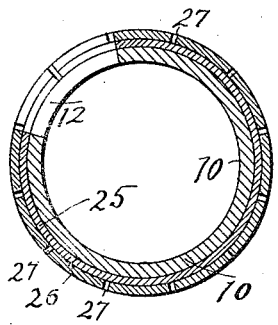
Figure 3:
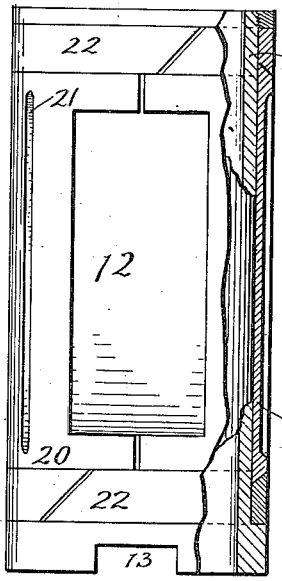
Figures 2, 6:
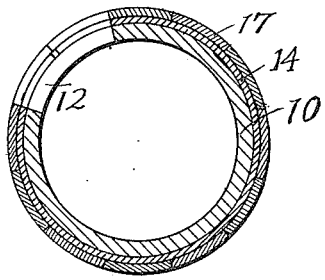

In the accompanying sheet of drawings wherein I have shown three forms of my invention, Figure 1 is a side view with parts broken away and illustrating one form of the invention; Fig. 2 is a transverse sectional view through the same; Fig. 3 is a side view with parts broken away showing a modification; Fig. 4 is a transverse sectional view with parts broken away through the valve of Fig. 3; Fig. 5 is a side view of a valve constructed in accordance with another form of the invention; and Fig. 6 is a transverse sectional view through the valve of Fig. 5.

In each form of my invention, the valve includes an inner cylindrical valve body 10, which is hollow and has a passageway extending from one end (in this case the upper end) down to the partition 11, constituting a curved gas deflector. In the side wall of the valve adjacent the deflector is a port 12. This deflector is designed to guide the gas either from the valve into the cylinder of the engine, or from the cylinder into the longitudinal passageway in the valve, depending upon whether the valve is employed as an inlet valve or as an exhaust valve. It may be here stated that preferably one of these valves is utilized as an inlet valve for two cylinders and one as an exhaust valve for the same cylinders, precisely as in the manner shown in my prior application aforesaid. It is not essential, however, that the valve be utilized as in said prior application, and it is not necessarily confined to gas engine use.

Each valve is designed to be driven by a driving spindle which is to be coupled but not rigidly connected to the lower end of the valve, the latter having at its lower end a notch 13 which is adapted to receive a correspondingly shaped projection at the upper end of the driving part.

Coming now to the packing features of the valve, and referring first to Figs. 1 and 2, the valve body is surrounded by a split spring expansion sleeve 14 which has a port opening coinciding with the port opening of the valve body and which is split or divided preferably on the longitudinal axis of the port opening, said sleeve being retained on the valve body between a shoulder 15 on the lower end of the valve body and the nut 16 screwed on to the upper end of the valve body. Surrounding the expansible or expansion sleeve 14 are a series of separate segments 17 which are arranged edge to edge as shown and extend longitudinally of the valve body or sleeve 14. Two of these segments which are arranged opposite the port 12 in the valve body have a port opening formed therein so as to coincide with the port opening in the valve body and in the inner expansion sleeve 14. These segments in effect constitute and may be considered as a second multi-part expansible sleeve composed of sections separated by narrow slots forming longitudinal edges for the purpose of preventing leakage circumferentially as will appear presently. The segments are retained in position by split spring rings 18 which have the dual function of holding the segments in place and of preventing leakage longitudinal of the valve.

The advantages of this construction are apparent. The segments adapt themselves to irregularities in the wall of the chamber, and by reason of the numerous edges extending longitudinally of the valve body from the upper ring 18 to the lower ring 18 leakage of gas circumferentially of the valve is minimized, especially as the segments are yieldingly pressed outward by the inner expansion sleeve 14. The shoulder 15 and the nut 16 bear very lightly on the inner wall of the valve chamber, even when the parts are subjected to the maximum heating effects, but the segments 17 and the split rings 18 bear with substantially uniform pressure on the wall of the valve chamber, and compensate for changes due to temperature variation, and thus render it impossible for the valve to stick. The packing is of course not connected to the elements which drive the valve, and consequently any slight movement of the valve body due to stresses created in the actuation of the valve are not transmitted to the packing. In fact, by reason of the manner in which the valve will be connected to the driving element the valve as a whole may be said to be a floating valve which is practically unaffected by wear in the bearings supporting the driving element.

In Figs. 3 and 4 substantially the same results are obtained with a modified construction. In this case the valve body 10 which is precisely the same as in the first described construction is surrounded by a split spring expansion sleeve 20 having a port or port opening in the side wall coinciding with the port in the valve body. This sleeve is provided on its outer surface with slots 21 extending lengthwise thereof practically from one end of the sleeve to the other. These slots form the longitudinally extending edges which prevent leakage circumferential of the valve and also give the sleeve the desired flexibility. Split spring rings 22 are arranged at the ends of the valve body and prevent leakage longitudinally of the valve as in the first described construction, these rings engaging respectively, one a shoulder on one end of the valve body, and the other an adjustable nut on the other end of the valve body.

In Figs. 5 and 6, a further modification is shown embodying some of the features of both of the first described constructions. In this case the valve body is surrounded by two closely fitting expansible sleeves 25 and 26, the inner sleeve being the split expansible sleeve similar to the expansible sleeve of Fig. 1, and the outer sleeve 26 being provided with longitudinally extending slots 27 cut entirely through the sleeve and extending alternately from opposite ends, each slot extending from one end toward and not quite to the opposite end. The sharp edges formed by the longitudinally extending slots minimize leakage circumferentially of the valve and the closeness of the fit between the inner and outer sleeves prevents leakage circumferentially of the valve between the two sleeves, that is, from one slot to some other slot circumferentially displaced therefrom. At the ends of the outer sleeves are provided expansible split rings 28 similar in all respects to the corresponding rings of the other construction, these rings in this instance holding the outer sleeve in position as well as preventing leakage of gas in an endwise direction.

In all three constructions, the expansion sleeves including the edge to edge segments of Fig. 1 and the split rings may be prevented from turning relative to the valve body in any desired manner, such as by a pin or projection on one part fitting into a groove or notch in the adjacent part.

In all three constructions above described, the longitudinally extending edges whether formed by the edges of the segments or otherwise formed as by slots in the expansion sleeves are sharp, the sharpness of the edges being essential to the highest efficiency. The slots above referred to may be filled with graphite or similar semi-solid lubricating substance, but whether or not this lubricating substance is employed, and though the slots become filled with carbon or other deposit the sharp edges still remain and function in the desired manner. The term slots employed in the claims is used in a broad or generic sense to cover the construction shown in Figs. 1 and 2 as well as in Figs. 3 to 6, for it will be apparent the divisions between the segments of Figs. 1 and 2 constitute very narrow slots which extend the full length and full depth of the outer expansible sleeve.

The broad subject-matter of this application is claimed in my prior application previously referred to herein, Serial No. 799,949, filed November 8, 1913.

Having thus described my invention, what I claim is:—

1. A rotary valve, comprising a valve body, a ported expansion sleeve surrounding the body and having longitudinally extending slots.

2. A rotary valve, comprising a valve body, a ported expansion sleeve surrounding the body and having longitudinally extending slots, and means for preventing leakage longitudinally of the valve.

3. A rotary valve, comprising a valve body, a ported expansible sleeve surrounding the valve body and having narrow slots forming sharp edges for the prevention of leakage circumferentially of the valve.

4. A rotary valve adapted particularly for an internal combustion engine, comprising a valve body, a ported expansible sleeve surrounding the valve body and having narrow slots forming sharp edges for the prevention of leakage circumferentially of the valve, and means comprising one or more expansible rings for preventing leakage longitudinally of the valve.

5. A valve adapted particularly for an internal combustion engine, comprising a cylindrical valve body, having a port in its side wall, a ported expansible sleeve surrounding the valve body and comprising a plurality of longitudinally extending contiguous sections.

6. A valve adapted particularly for an internal combustion engine, comprising a cylindrical valve body, having a port in its side wall, a ported expansible sleeve surrounding the valve body and comprising a plurality of longitudinally extending contiguous sections, and a pair of split spring rings at the ends of the sleeve for preventing leakage longitudinally of the valve.

7. A rotary valve adapted particularly for an internal combustion engine, comprising a hollow cylindrical valve body open at one end and provided with a port in its side wall, a deflector in the valve adjacent the port, and means for preventing leakage both circumferentially and longitudinally of the valve comprising an expansible sleeve entirely surrounding the valve and formed in contiguous sections and one or more expansible split rings surrounding the valve body.

8. In a rotary valve, a valve body, a ported sleeve surrounding the body and comprising a plurality of contiguous segments.

9. In a rotary valve, a valve body, a ported sleeve surrounding the body and comprising a plurality of contiguous segments, and expansible means for expanding said segments.

10. In a rotary valve, a valve body, a ported sleeve surrounding the body and comprising a plurality of contiguous segments, and means for retaining said segments on the body.

11. In a rotary valve, a valve body, a ported sleeve surrounding the body and comprising a plurality of independent segments arranged edge to edge.

12. In a rotary valve, a valve body, a ported sleeve surrounding the body and comprising a plurality of independent segments arranged edge to edge, and split spring rings adjacent the ends of the sleeve.

13. In a rotary valve, a valve body, a ported sleeve surrounding the body and comprising a plurality of contiguous segments, and an expansible split sleeve between the segments and valve body.

14. A rotary valve, comprising a valve body, a ported expansible sleeve surrounding the body and provided with longitudinally extending slots dividing the sleeve in contiguous sections.

15. A rotary valve, comprising a valve body, a ported sleeve surrounding the same and formed into a plurality of contiguous sections.

16. In a valve, a valve body, a ported packing sleeve surrounding the valve body and comprising a plurality of segments, and means for yieldingly pressing the segments outwardly.

17. In a rotary valve, a valve body, means surrounding the body, said surrounding means and valve body having registering ports, and means acting on said surrounding means to spread the same outwardly.

18. A rotary valve comprising a ported valve body, adjacent or adjoining sectors surrounding the body, and expansible means acting on said members to spread the same outwardly.

19. In a rotary valve, a valve body, a sleeve comprising a plurality of sectors, said sleeve and the body having registering port openings, and split expansible means between said valve body and the sleeve for expanding the latter.

In testimony whereof, I hereunto affix my signature in the presence of two witnesses.

CLIFFORD S. GOBY.

Witnesses:
A. F. KWIS,
L. I. PORTER.